United States Patent
Hasegawa et al.

(10) Patent No.: US 9,986,167 B2
(45) Date of Patent: May 29, 2018

(54) DISPLAY CONTROL APPARATUS, DISPLAY CONTROL METHOD AND STORAGE MEDIUM

(71) Applicant: CASIO COMPUTER CO., LTD., Shibuya-ku, Tokyo (JP)

(72) Inventors: Hirokazu Hasegawa, Koganei (JP); Ryo Nimura, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days. days.

(21) Appl. No.: 15/187,361

(22) Filed: Jun. 20, 2016

(65) Prior Publication Data

US 2017/0054912 A1 Feb. 23, 2017

(30) Foreign Application Priority Data

Aug. 19, 2015 (JP) .................................. 2015-161668

(51) Int. Cl.
*H04N 5/232* (2006.01)
*H04N 1/00* (2006.01)

(52) U.S. Cl.
CPC ..... *H04N 5/23293* (2013.01); *H04N 1/00132* (2013.01); *H04N 5/23222* (2013.01)

(58) Field of Classification Search
CPC ........... H04N 5/23293; H04N 5/23216; H04N 1/00132; G06G 3/04842
See application file for complete search history.

(56) References Cited

U.S. PATENT DOCUMENTS

| 6,049,033 A | * | 4/2000 | Dallas | B42D 9/06 40/531 |
|---|---|---|---|---|
| 7,289,132 B1 | * | 10/2007 | Reid | G06F 17/30265 345/660 |
| 7,586,524 B2 | * | 9/2009 | Tsue | G11B 27/034 348/231.2 |
| 8,553,241 B2 | | 10/2013 | Sato | |
| 8,982,428 B2 | | 3/2015 | Hasegawa | |

(Continued)

FOREIGN PATENT DOCUMENTS

| JP | 2009033451 A | 2/2009 |
|---|---|---|
| JP | 2009239594 A | 10/2009 |

(Continued)

OTHER PUBLICATIONS

Japanese Office Action (and English translation thereof) dated Jun. 12, 2017, issued in counterpart Japanese Application No. 2015-161668.

*Primary Examiner* — Hung Lam
(74) *Attorney, Agent, or Firm* — Holtz, Holtz & Volek PC

(57) ABSTRACT

A plurality of captured images having a successive relation is displayed on a display screen with the successive relation being maintained. Then, when the plurality of captured images include a plurality of first captured images acquired by a plurality of successive photographing operations and a second captured image acquired by an individual photographing operation different from the plurality of successive photographing operations, the second captured image is displayed such that it is differentiated from the plurality of first captured images by, for example, the background area of the second captured image being represented in a display form different from that of another area.

19 Claims, 8 Drawing Sheets

(56) References Cited

U.S. PATENT DOCUMENTS

| | | | |
|---|---|---|---|
| 9,643,442 B2* | 5/2017 | Hasegawa | H04N 5/232 |
| 2002/0122067 A1* | 9/2002 | Geigel | G06F 17/30265 |
| | | | 715/788 |
| 2006/0103891 A1* | 5/2006 | Atkins | H04N 1/00132 |
| | | | 358/450 |
| 2011/0141506 A1 | 6/2011 | Sato | |
| 2012/0109776 A1* | 5/2012 | Fagans | G06Q 30/0621 |
| | | | 705/26.5 |
| 2013/0179816 A1* | 7/2013 | Seo | G06F 3/04842 |
| | | | 715/770 |
| 2014/0375802 A1 | 12/2014 | Hasegawa | |
| 2015/0174942 A1 | 6/2015 | Hasegawa | |
| 2016/0080606 A1* | 3/2016 | Nimura | H04N 1/409 |
| | | | 358/449 |

FOREIGN PATENT DOCUMENTS

| | | |
|---|---|---|
| JP | 2011146032 A | 7/2011 |
| JP | 2014117893 A | 6/2014 |
| JP | 2015006754 A | 1/2015 |

* cited by examiner

DISPLAY CONTROL APPARATUS, DISPLAY CONTROL METHOD AND STORAGE MEDIUM

CROSS-REFERENCE TO RELATED APPLICATION

This application is based upon and claims the benefit of priority from the prior Japanese Patent Application No. 2015-161668, filed Aug. 19, 2015, the entire contents of which are incorporated herein by reference.

BACKGROUND OF THE INVENTION

1. Field of the Invention

The present invention relates to a technique for displaying a plurality of captured images on a display screen.

2. Description of the Related Art

Conventionally, a technique is known in which overlapping pages of a book or the like (for example, book or magazine) are separated and turned one by one by using an automatic page turning apparatus. Also, a technique is known in which each page is photographed and converted into electronic data and then electronic data of a plurality of pages is recorded as a book file (for example, refer to Japanese Patent Application Laid-Open (Kokai) Publication No 2014-117893 and No 2015-006754).

In the case where a book file is created, it is difficult to ensure quality as a book if captured images, that is, a series of page images acquired by photographing each page are used as they are. Therefore, various editing operations are required to be performed on the series of page images, which are cumbersome if the number of pages of the book is large.

SUMMARY OF THE INVENTION

The present invention has been conceived in light of the above-described problem. An object of the present invention is to improve operability when a series of page images are edited.

In accordance with one aspect of the present invention, there is provided a display control apparatus comprising: a display control section which causes a plurality of captured images having a successive relation to be displayed on a display screen with the successive relation being maintained, wherein the display control section, when the plurality of captured images include a plurality of first captured images acquired by a plurality of successive photographing operations and a second captured image acquired by an individual photographing operation different from the plurality of successive photographing operations, causes the second captured image to be displayed on the display screen such that the second captured image is differentiated from the plurality of first captured images.

In accordance with another aspect of the present invention, there is provided a display control method comprising: displaying a plurality of captured images having a successive relation on a display screen with the successive relation being maintained; and displaying, when the plurality of captured images include a plurality of first captured images acquired by a plurality of successive photographing operations and a second captured image acquired by an individual photographing operation different from the plurality of successive photographing operations the second captured image on the display screen such that the second captured image is differentiated from the plurality of first captured images.

In accordance with another aspect of the present invention, there is provided a non-transitory computer-readable storage medium having stored thereon a program that is executable by a computer to actualize functions comprising: displaying a plurality of captured images having a successive relation on a display screen with the successive relation being maintained; and displaying, when the plurality of captured images include a plurality of first captured images acquired by a plurality of successive photographing operations and a second captured image acquired by an individual photographing operation different from the plurality of successive photographing operations, the second captured image on the display screen such that the second captured image is differentiated from the plurality of first captured images.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

DETAILED DESCRIPTION OF THE PREFERRED EMBODIMENT

One embodiment will hereinafter be described with reference to the drawings.

Figure 1:
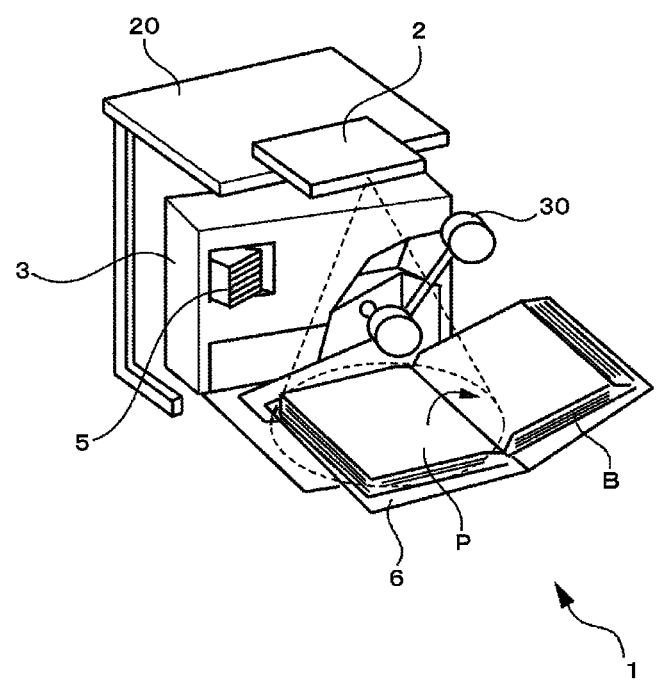
FIG. 1 is a perspective view outlining the structure of a graphic camera system.

FIG. 1 is a perspective view outlining the structure of a graphic camera system 1 according to one embodiment. This graphic camera system 1 is constituted by a tablet 2 having a function to operate as a file management apparatus and an automatic page turning apparatus 3.

The automatic page turning apparatus 3 includes a holding table 6 which holds an opened book B or the like, a page-turning mechanism 30 which holds a page P at a page-turning start point of the page P of the book B or the like on the holding table 6 and releases the holding of the page P at a page-turning end point of the page P, and an air blowing section 5 which blows air to the page P at the page-turning end point by blowing air such that it passes above the page P at the page-turning start point.

The tablet 2 is a portable information processing terminal including a camera (imaging section described further below). By being installed above the book (or magazine) B by a stand 20, the tablet 2 photographs a page P of the book B at a page-turning start point. The tablet 2 and the automatic page turning apparatus 3 are communicable via a short-range wireless communication adaptor of Bluetooth (registered trademark). Wi-Fi (registered trademark), or the like incorporated therein.

The graphic camera system 1 separates and turns over the pages P of the book B or the like (magazine) one by one by using the automatic page turning apparatus 3, photographs each page by the tablet 2 for conversion into electronic data, and records electronic data of a plurality of pages as a file in a predetermined format (hereinafter referred to as a book file).

Figure 2:
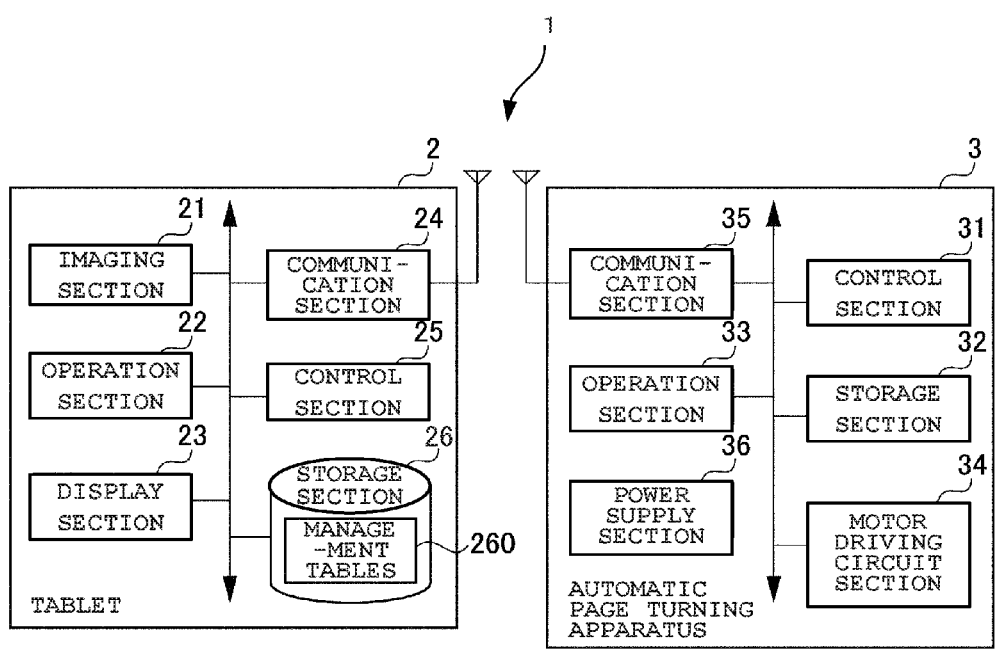
FIG. 2 is a block diagram showing the main portion of the electric structure of the graphic camera system.

FIG. 2 is a block diagram showing the main portions of the electric structures of the tablet 2 and the automatic page turning apparatus 3. First, the electric structure of the automatic page turning apparatus 3 is described.

The automatic page turning apparatus 3 mainly includes a control section 31, a storage section 32, an operation section 33, a motor drive circuit section 34, a communicating section 35, and a power supply section 36. The storage section 32 includes a ROM (Read Only Memory) having various programs recorded therein and a RAM (Random Access Memory) where these programs are developed.

The operation section 33, for example, includes a start switch for starting page turning processing and a stop switch for stopping page turning processing. The motor drive circuit section 34, for example, includes a motor for driving the page-turning mechanism 30, a motor for driving a fan provided in the air blowing section 5, and a motor driver for driving these motors.

The control section 31 controls the motor drive circuit section 34 from when the start switch is operated until when the stop switch is operated so as to drive the page-turning mechanism 30, and thereby separates and turns the pages P of the book B or the like one by one. The communicating section 35 is a communication interface for communication with the tablet 2, and connects to the tablet 2 by a communication method such as Bluetooth (registered trademark) or Wi-Fi (registered trademark). The power supply section 36 supplies electric power to each of the above-described blocks 31 to 35.

Next, the electric structure of the tablet 2 is described. The tablet 2 is mainly includes an imaging section 21, an operation section 22, a display section 23, a communicating section 24, a control section 25, and a storage section 26.

The imaging section 21 is a camera capable of capturing page images of the book B or the like, and has an image sensor constituted by a CCD (Charge Coupled Device) or CMOS (Complementary Metal Oxide Semiconductor), or the like, in addition to an optical system including a lens. By this image sensor, a light image that has entered through the lens is converted into an analog image signal, subjected to color separation and gain adjustment for each color component, and then converted into digital data.

The display section 23 has a display monitor such as an LCD (Liquid Crystal Display) and organic EL (Electra Luminescence), and displays page images captured by the imaging section 21, various types of information, and the like on the screen of the display monitor.

The operation section 22 includes a minimum number of operation switches such as a power supply key not depicted and a touch panel integrally provided on the surface of the display monitor of the display section 23, and supplies information regarding operations on the tablet 2 by the user to the control section 25.

The communicating section 24 is a communication interface for communication with the automatic page turning apparatus 3, and connects the tablet 2 thereto by a communication method such as Bluetooth (registered trademark) or Wi-Fi (registered trademark).

The control section 25 includes a CPU (Central Processing Unit), its peripheral circuits and the like, and a RAM (Random Access Memory), and controls each section of the tablet 2. Note that the CPU may be a processor or the like.

In the storage section 26, for example, a semiconductor memory is mounted, and various application programs, various data generated in the process of executing programs by the control section 25, and the like are stored. The above-described application programs include a book management program for photographing each page of a book or the like by the automatic page turning apparatus 3, storing page images acquired by the image photographing in the storage section 26 as book files, and browsing and editing the stored book files.

Also, the storage section 26 stores a plurality of captured page images acquired by photographing each page of a book or the like in the course of book file generation and captured images acquired by photographing each of the front cover, end sheet (on a back cover side), back cover, and end sheet (on a front cover side) of the book.

In this storage section 26, an area is allocated for storing a management table 260 that manages book files, page images, and captured images of covers and the like for each target book to be converted into electronic data. For each target book or the like to be converted into a file, the management table 260 has stored therein a correspondence relation between each page image of a plurality of pages and each page of a book or the like before being stored as a book file, and management information indicating processing stages of page images of a plurality of pages and captured images of covers and the like.

When a book or the like is to be converted into electronic data by using the above-described graphic camera system 1 and stored as a book file, the tablet 2 is arranged above the automatic page turning apparatus 3 as depicted in FIG. 1 and, in this state, photographs each page of the book or the like to acquire page images while controlling the page turning operation of the wirelessly- connected automatic page turning apparatus 3 (a first series photographing process). Here, left pages of the book or the like are acquired by a series of photographing operations, and then right pages thereof are acquired by a series of photographing operations (the first series photographing process). In addition, the covers and the like of the book are photographed to obtain their images. Then, the tablet 2 performs various editing operations on the acquired page images and the like, and combines the resultant page images into a single file, whereby a book file is generated.

Next, the operation of the tablet 2 in the course of book file generation is described with reference to FIG. 3 to FIG. 6. First, an operation in a page editing mode based on the book management program is described.

The page editing mode is a mode for performing page editing, such as page image replacement or page image insertion, for page images of a plurality of pages (hereinafter referred to as a series of page images) acquired individually by a photographing operation performed for each page of a book or the like, that is, successive photographing operations performed for a plurality of times, and stored in the storage section 26.

Note that the page editing mode is not only an operation mode that can be set by a user operation but also an operation mode to which a photographing mode for photographing the pages, front covers, and the like of a book or the like automatically makes a transition after the end of its operations. Also, the series of page images herein that serve as editing targets in the page editing mode are a series of left page images which have been acquired by photographing only the left pages of a book or the like and whose correspondence relation with the respective pages is being managed (linked) by the management table 260 and a series of right page images which have been acquired by photographing only the right pages of the book or the like and whose correspondence relation with the respective pages is being managed (linked) by the management table 260.

Figure 3:
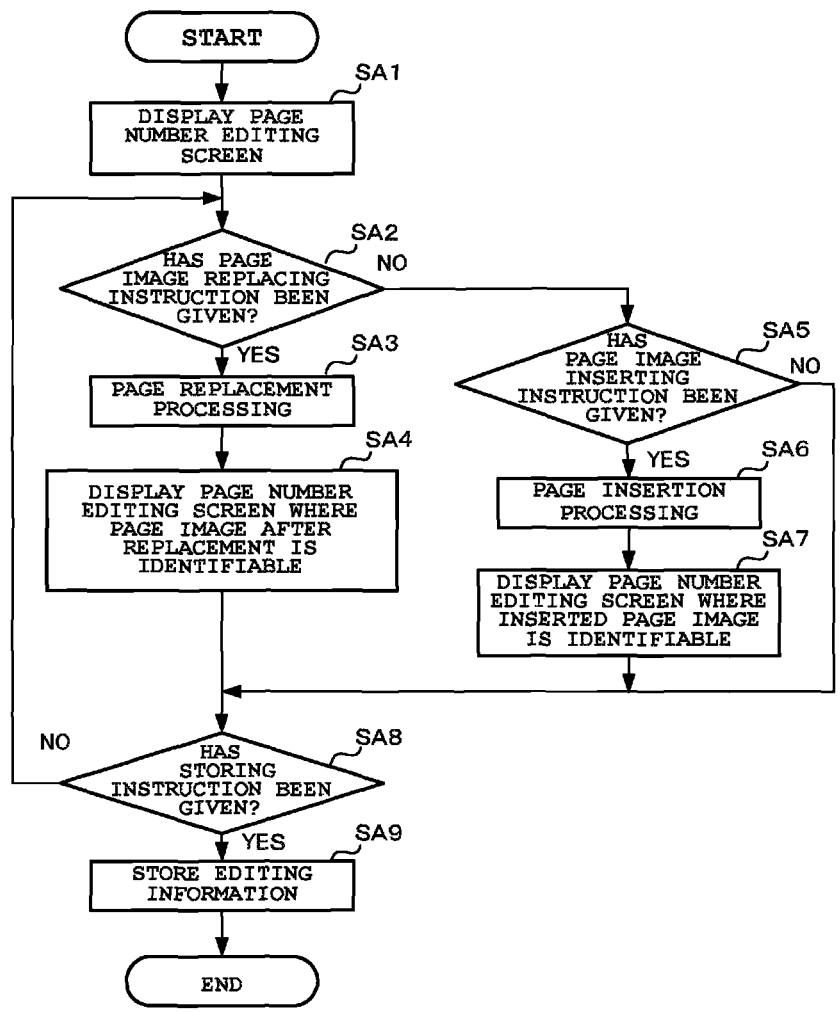
FIG. 3 is a flowchart for describing an operation of a tablet in an editing mode.

FIG. 3 is a flowchart for describing details of processing to be performed by the control section 25 when the tablet 2 operates in the page editing mode based on the book management program. As depicted in FIG. 3, the control section 25 first causes a page number editing screen G1 depicted in FIG. 4 or FIG. 5 to be displayed on the display screen of the display section 23 (Step SA1). The page number editing screen G1 is constituted by a function display area Ga fixedly allocated along an upper edge and a general area Gb other than the function display area Ga.

In the function display area Ga, various display elements are displayed, which include a caption c1 ("page numbers" in the drawings) indicating a current operation status, an edit button B1 for giving an instruction for editing, and a store button b2 for giving an instruction for storing. Note that display elements displayed on the display screen of the display section 23 and constituted by characters graphics, and the like that are subjected to a touch operation as required by the user to achieve GUI (Graphical User Interface) are referred to as "buttons".

For the display of the page number editing screen G1, the control section 25 causes a series of left page images 101 and a series of right page images 201 stored in the storage section 26 to be displayed in the general area Gb in a reduced form and be aligned in accordance with their page order ranks.

Specifically, each left page image 101 and each right page image 102 are taken as one set and laterally arranged without a gap to represent a book in a double-page spread state. In addition, the respective sets are arranged in a longitudinal direction in accordance with the page order ranks. In the following descriptions, the left page image 101 and the right page image 201 are referred to as "page images" as required.

Also, for the display of the page number editing screen G1, the control section 25 causes page number objects 301 to be displayed on the left side of each left page image 101 and on the right side of each right page image 201. In each page number object 301, a page number 302 corresponding to a page image (a relevant one of the left page image 101 and the right page image 201) and a total number 303 of relevant ones of the left page images 101 and the right page images 201 are vertically displayed. Furthermore, for the display of the page number editing screen G1 the control section 25 causes a ruler 401 to be displayed along the right side of the general area Gb. This ruler 401 indicates to which range in all the pages of the book the currently-displayed page images correspond.

Figure 4:
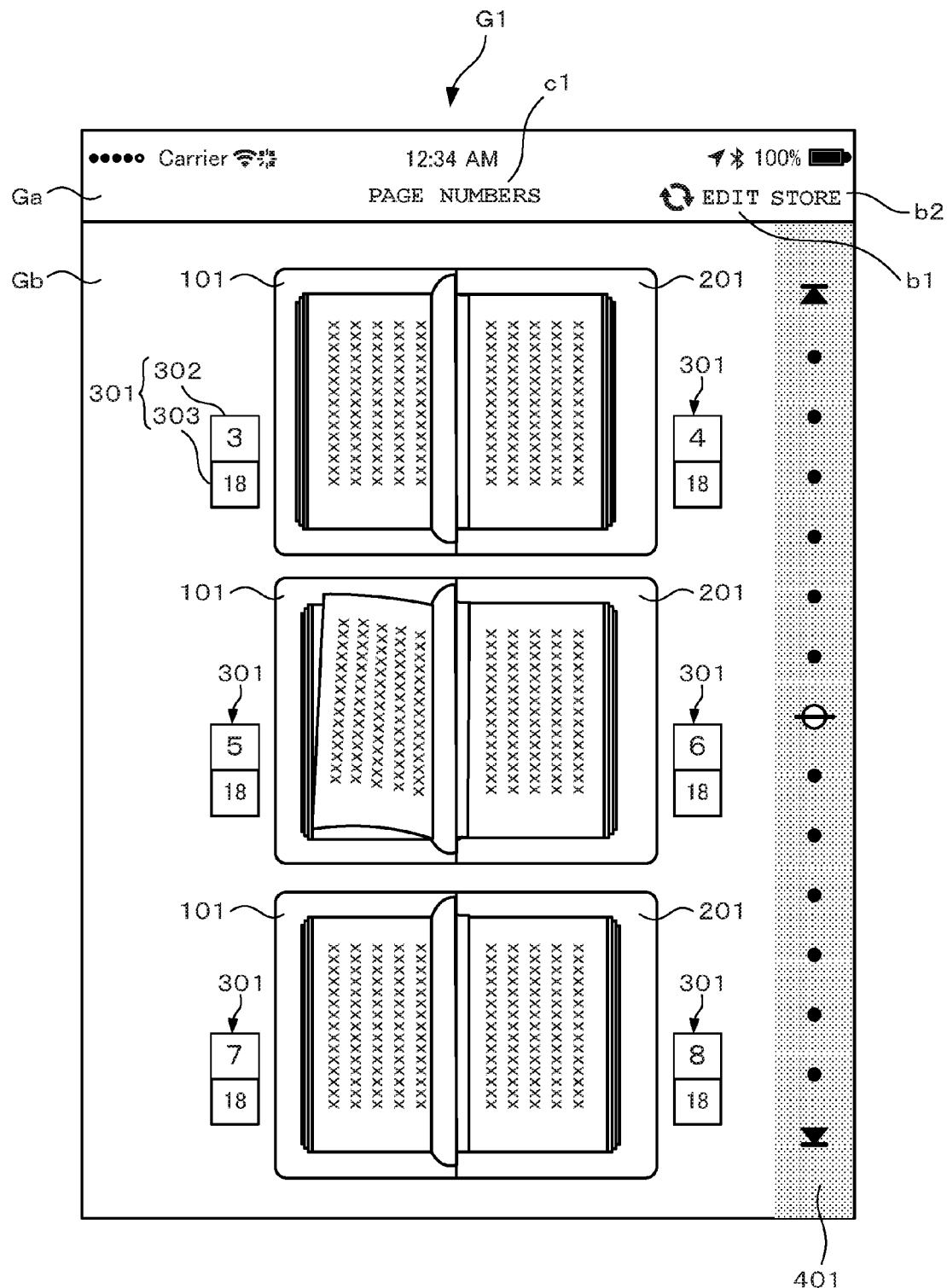
FIG. 4 is a diagram showing one example of a page number editing screen.
Figure 5:
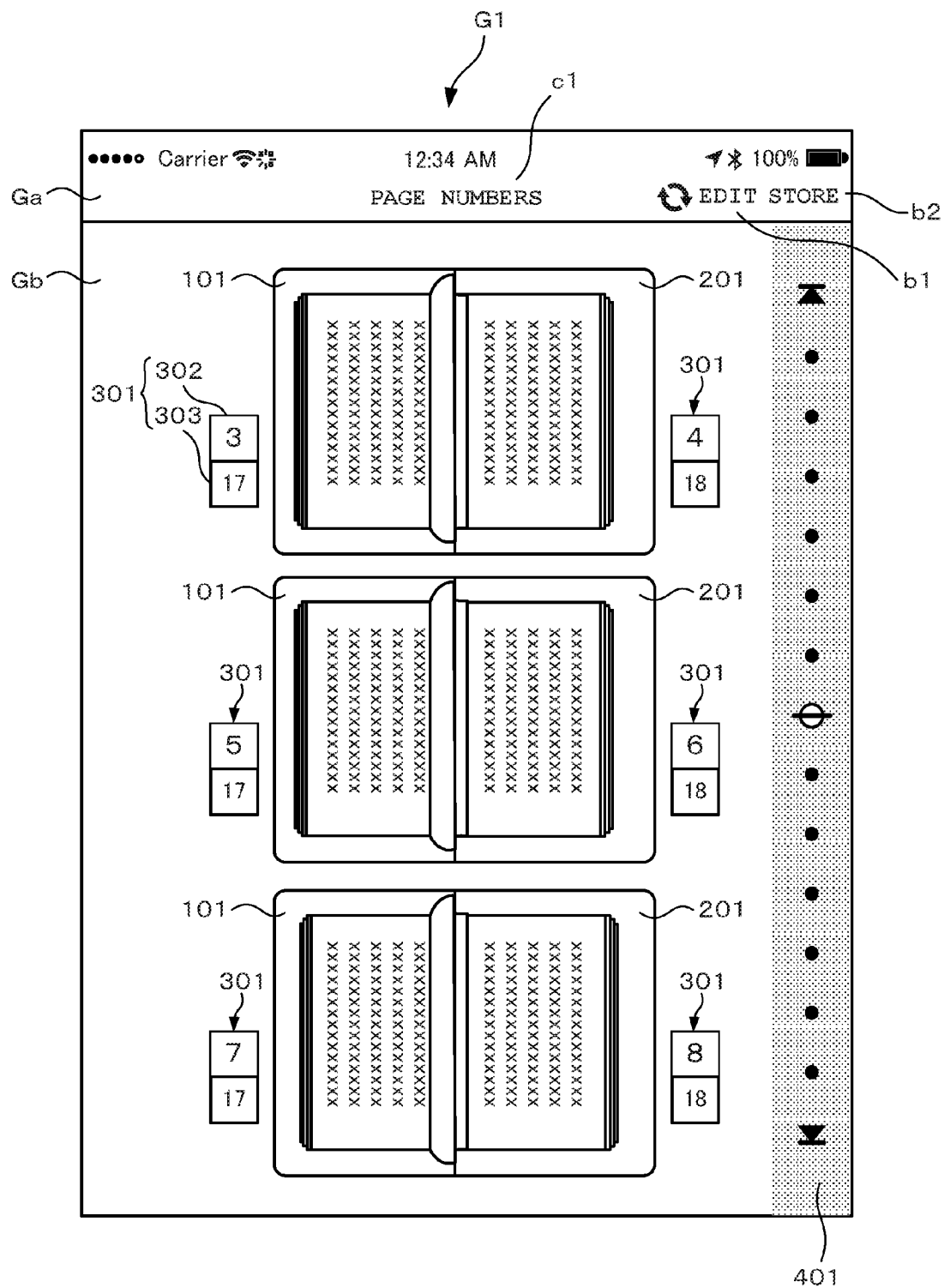
FIG. 5 is a diagram showing another example of the page number editing screen.
Figure 6:
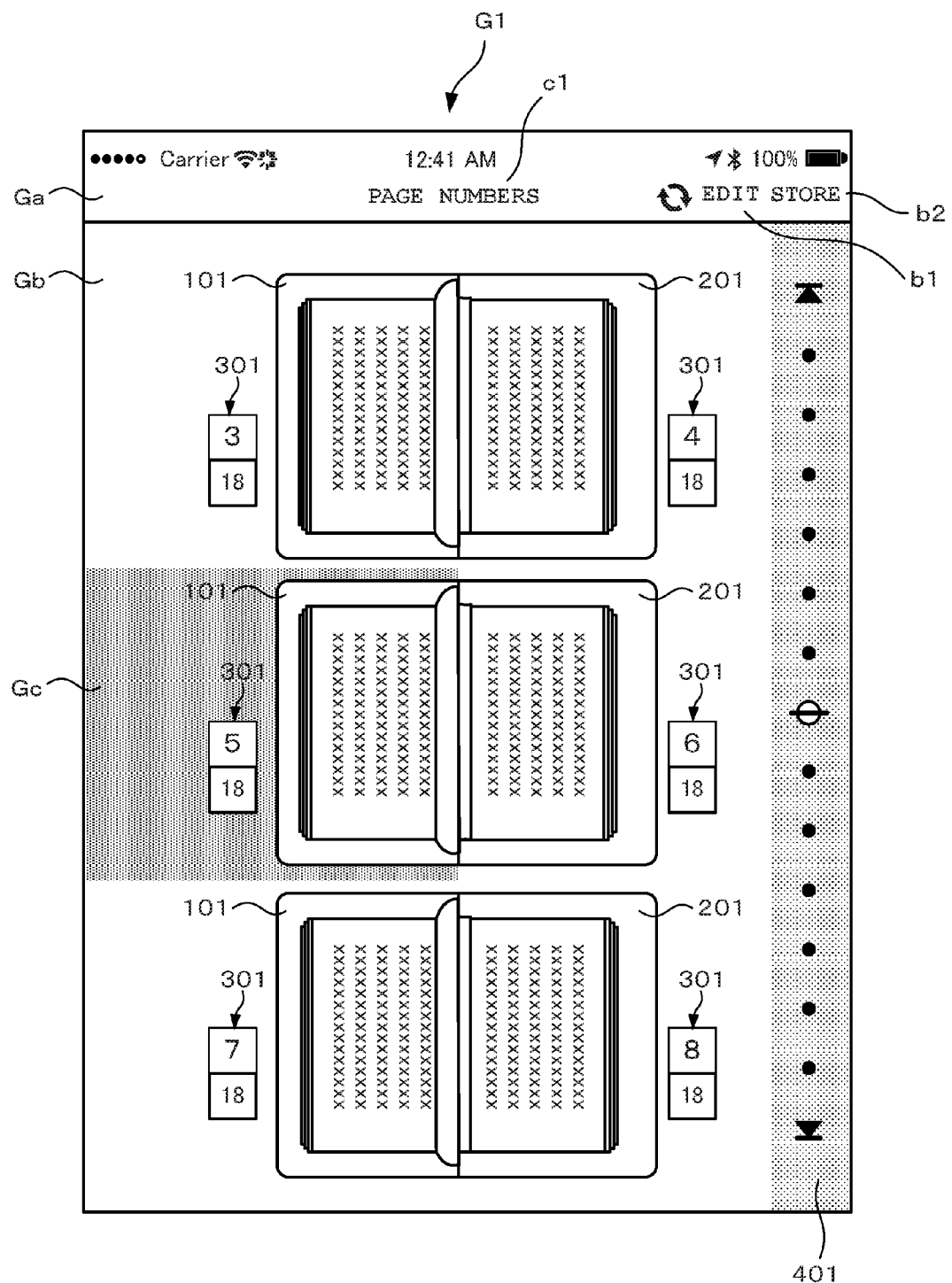
FIG. 6 is a diagram showing one example of the updated page number editing screen.

Here, a difference in the page number editing screen G1 between FIG. 4 and FIG. 5 is described. FIG. 4 depicts an example in which a left page image 101 (the left page image on the fifth page in FIG. 4) acquired by photographing a left page with a floating edge side is present among a series of left page images. FIG. 5 depicts an example in which a left page has been omitted during left page photographing.

Specifically, a preceding page P and the subsequent page P are turned together by one turning operation by the automatic page turning apparatus 3, so that a left page image, which is originally present is missing in the series of left page images. In the example of FIG. 5, the total number of the series of left page images is "17", which is smaller than the total number of the series of right images, "18", by one.

Here, although omitted in FIG. 3, when the page number editing screen G1 is being displayed, the control section 25 causes the screen (only the general area Gb) to be scrolled in response to a scroll operation by the user on the display screen so that arbitrary left page images 101 and arbitrary right page images 201 can be checked. Here, the control section 25 causes the page numbers 302 of the page number objects 301 and the ruler 401 to be updated in accordance with newly-displayed left page images 101 and right page images 201.

Note that a configuration different from that of the present embodiment may be adopted in which left page images 101 and right page images 201 for all the pages of a book can be checked by the display screen being switched in response an operation of switching the display screen by the user.

After the page number editing screen G1 is displayed at Step SA1, when an instruction for replacing a page image is provided from the user (YES at Step SA2), the control section 25 performs page replacement processing (Step SA3). The instruction for replacing a page image from the user is given by the user touching a desired page image in the page number editing screen G1.

The page replacement processing is processing of replacing a page image specified by the user's touch operation by another page image individually captured. More specifically, it is actually processing of temporarily storing a correspondence relation with another page image in place of a page image specified by the user from among a series of page images being edited. For example, in the page number editing screen G1 depicted in FIG. 4, when the left page image 101 on the fifth page is touched by the user, the control section 25 replaces the left page image 101 on the fifth page by another left page image.

Also, although not depicted, specific processing details are as follows. That is, in page replacement processing, a predetermined selection screen is displayed separately from the page number editing screen G1 to prompt the user to select one of "another page image" and "page image that is acquired by re-photographing" as a page image for replacement (page image to be newly used).

Then, when "another page image" is selected, the control section 25 causes the predetermined specified screen to be displayed in place of the above-described selection screen to prompt the user to select another page image which has been individually captured separately from the series of page images currently being edited (i.e., separately from the page images captured in the first series photographing process), has already been stored in the storage section 26, and is showing the same page as that of the page image specified in the page number editing screen G1. Then, the control section 25 replaces the page image specified in the page number editing screen G1 by the page image for replacement selected by the user.

On the other hand, when "page image that is acquired by re-photographing" is selected, the control section 25 prompts the user to perform a photographing operation for re photographing only the same page as that of the page image specified in the page number editing screen G1, acquires a new page image of the same page, and stores the page image in the storage section 26. Then, the control section 25 replaces the page image specified in the page number editing screen G1 by the new page image.

After the page replacement processing, the control section 25 causes the page number editing screen G1 where the page image after the replacement is identifiable to be displayed on the display screen of the display section 23 (Step SA4). For example, when the page number editing screen G1 depicted in FIG. 4 is being displayed, the control section 25 performs page replacement processing with the left page image 101 on the fifth page as a target in response to a user operation, and then causes the page number editing screen G1 depicted in FIG. 6 to be newly displayed.

Specifically, a background area Gc of the replaced left page image 101 on the fifth page is represented with a color different from the color of the other general area Gb. As a result, the background area Gc is represented in a display form different from that of the other general area Gb, whereby the replaced left page image 101 is made identifiable.

Also, separately from the above-described processing, when an instruction to insert a page image is provided from the user (NO at Step SA2 and YES at Step SA5) after the page number editing screen G1 is displayed at Step SA1, the control section 25 performs page insertion processing (Step SA6).

Although not depicted, the page insertion instruction is given by the user touching the edit button b1 in the page number editing screen G1 and then specifying (touching) a page position on the screen where a page image is to be inserted. The page insertion processing is processing of inserting a page image acquired by photographing a page specified by the user by a touch operation (hereinafter simply referred to as a specified page) into the series of page images currently being edited. More specifically, it is actually processing for newly adding a captured page image to the series of page images currently being edited, and temporarily storing a correspondence relation with the specified page.

For example, in the page number editing screen G1 depicted in FIG. 5, when the left page image 101 on the sixth page is erroneously displayed as the left page image 101 on the fifth page, that is, when the left page image on the fifth page is missing in the series of left page images, the control section 25 inserts the left page image on the fifth page in response to a user instruction.

Also, although not depicted, specific processing details are as follows. That is, in the page insertion processing, a predetermined selection screen is displayed separately from the page number editing screen G1 to prompt the user to select one of "another page image" and "page image that is acquired by re-photographing" as a page image to be inserted (page image to be newly used).

Then, when "another page image" is selected, the control section 25 causes the predetermined specified screen to be displayed in place of the above-described selection screen to prompt the user to select another page image which has been individually captured separately from the series of page images (left page images and right page images) currently being edited, has already been stored in the storage section 26, and showing the missing page. Then, the control section 25 inserts the user-selected page image for insertion into a page position specified on the page number editing screen G1.

On the other hand, when "page image that is acquired by re-photographing" is selected, the control section 25 prompts the user to perform a photographing operation at this point for re-photographing only the specified page, acquires a new page image, and stores the page image in the storage section 26. Then, the control section 25 inserts the new page image at the user-specified page position.

After the page insertion processing, the control section 25 causes the page number editing screen G1 where the inserted page image is identifiable to be displayed on the display screen of the display section 23 (Step SA7). For example, when the control section 25 depicted in FIG. 5 is being displayed, the control section 25 performs page insertion processing of inserting the left page image 101 on the fifth page in response to a user operation, and then causes the page number editing screen G1 depicted in FIG. 6 to be newly displayed. That is, the background area Gc of the inserted left page image 101 is represented with a color different from the color of the other general area Gb, and thereby the inserted left page image 101 is made identifiable.

After the new page number editing screen G1 is displayed in the processing at Step SA4 or Step SA7, the control section 25 returns to the processing at Step SA2, and repeatedly performs the following processing until a storing instruction is provided from the user by a touch operation on the store button b2 (NO at Step SA8).

Then, when a storing instruction is provided from the user (YES at Step SA8), the control section 25 stores information regarding the series of page images, that is, editing information temporarily stored in the processing at Step SA4 or Step SA7, in the storage section 26 (Step SA9). That is, the control section 25 updates management information in the management table 260 and newly writes information indicating a page corresponding to the replaced page image or inserted page image as management information. As a result, the processing in the page editing mode is ended.

As described above, in the page editing mode, in the display of the page number editing screen G1 after page replacement processing or page insertion processing, a replaced/inserted left page image 101, that is, a page image which has been acquired by an individual photographing operation and is different from other page images is made identifiable.

Therefore, while performing a page editing operation such as replacement or insertion on a series of page images (left page images and right page images), the user can immediately distinguish a page image already processed even without reviewing individual page images. As a result, operability in editing a series of page images can be improved. In particular, this effect is significant when the number of a series of page images, that is, the number of pages of a book or the like to be converted into electronic data is large.

Figure 7:
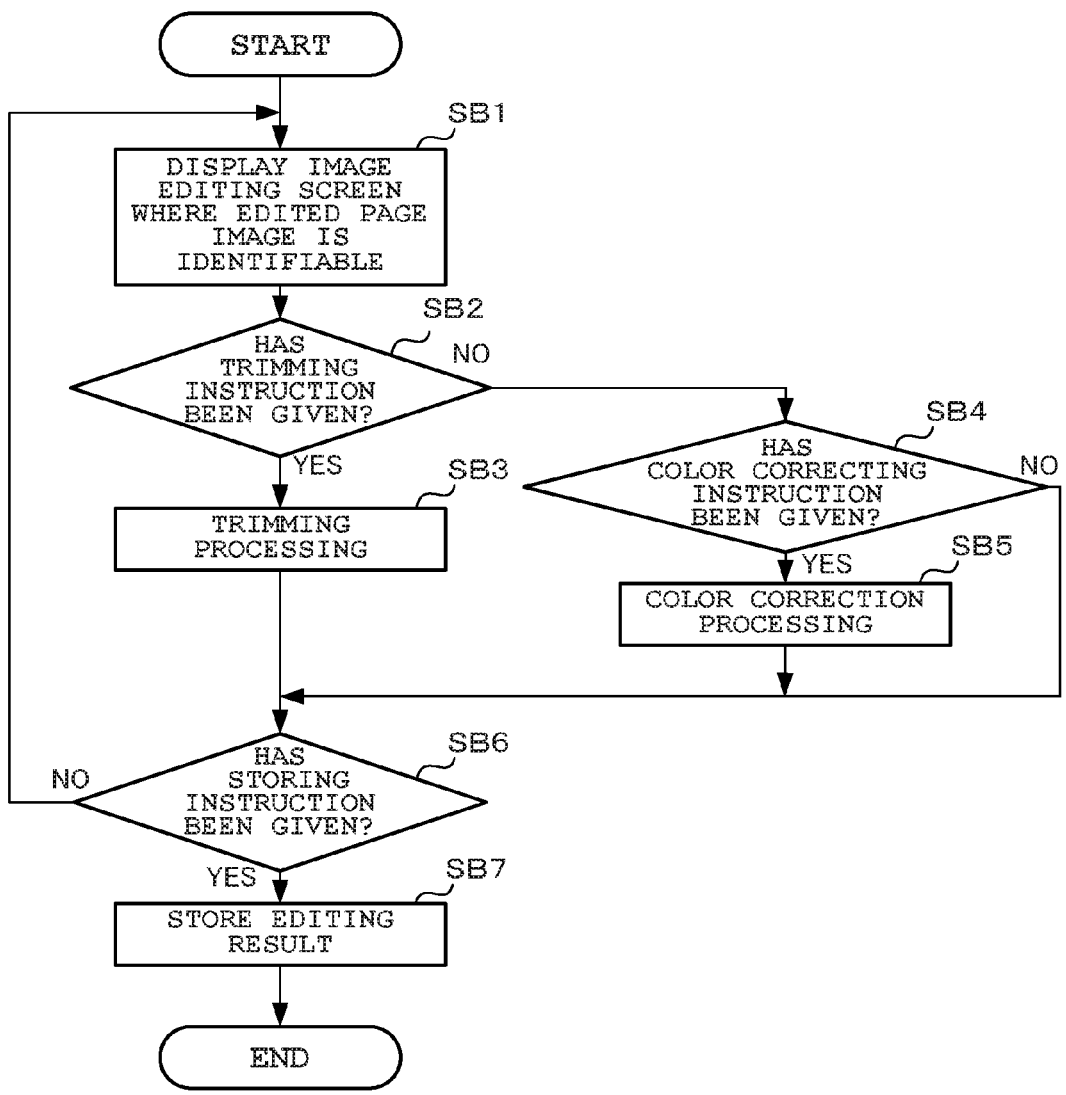
FIG. 7 is a flowchart for describing an operation of the tablet in an image editing mode.
Figure 8:
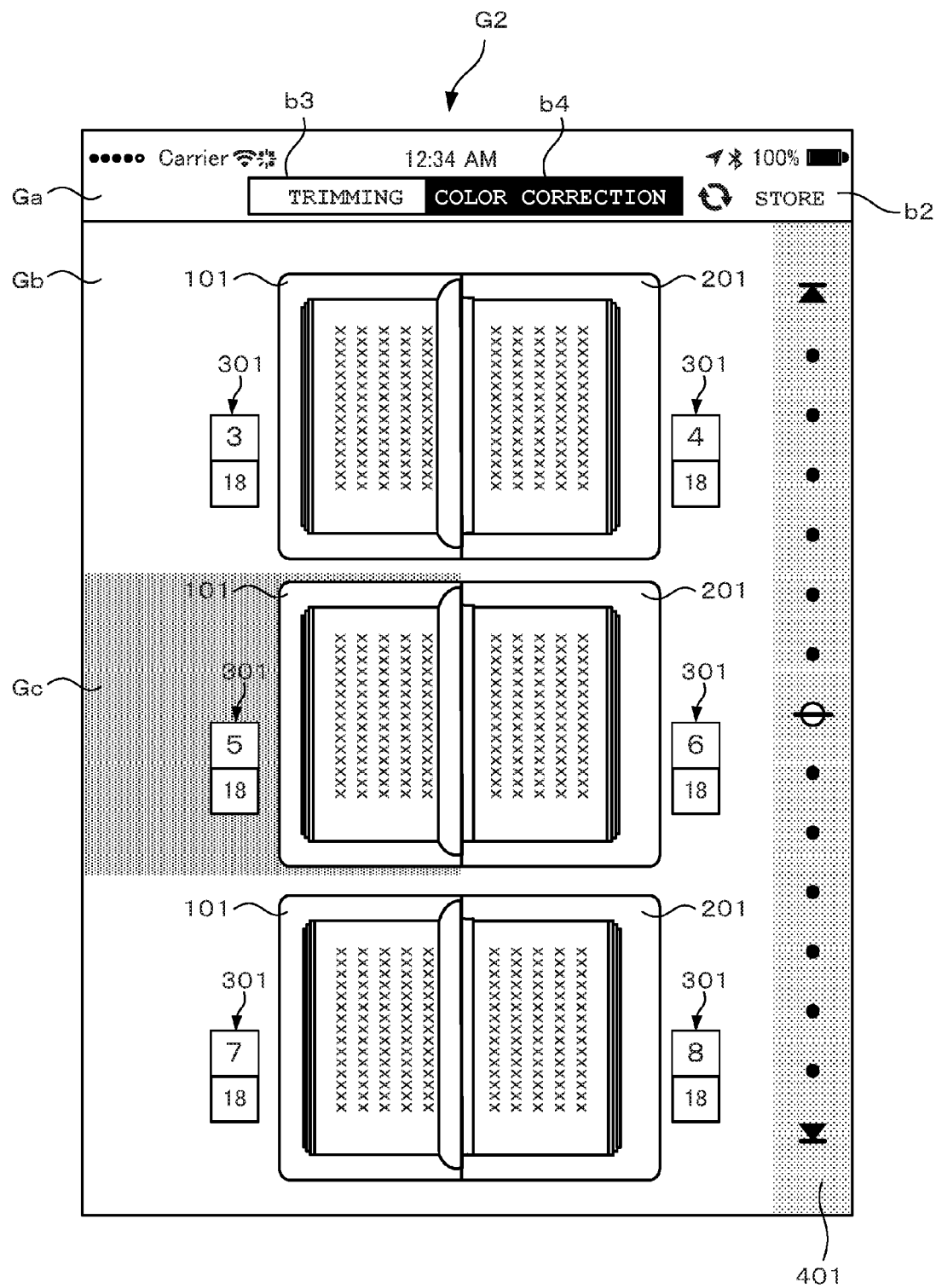
FIG. 8 is a diagram showing one example of an image editing screen.

Next, an operation in an image editing mode in the tablet 2 based on the book management program is described with reference to FIG. 7 and FIG. 8. The image editing mode is an operation mode provided to individually or collectively edit a series of page images stored in the storage section 26. Examples of this image editing include trimming and color correction. FIG. 7 is a flowchart for describing details of processing to be performed by the control section 25 in the image editing mode.

As depicted in FIG. 7, the control section 25 sets the image editing mode and concurrently starts the processing. First, the control section 25 displays, on the display screen of the display section 23, an image editing screen G2 such as that depicted in FIG. 8 in which a page image subjected to page editing is identifiable (Step SB1).

The image editing screen G2 is substantially the same as the above-described page number editing screen G1, and main differences therebetween are as follows. That is, in place of the caption c1, a trimming button b3 and a color correction button b4 which are used for selection in image editing and represent selected state by inverse display are arranged in the function display area Ga, and the edit button b1 is deleted.

For the display of the image editing screen G2, as in the case of the page number editing screen G1, the control section 25 causes a series of left page images 101 and a series of right page images 201 stored in the storage area Gb to be displayed in a reduced form and aligned in accordance with the corresponding page order ranks.

Here, based on management information written in the management table 260, the control section 25 judges whether page editing such as replacement or insertion has been performed on each page image in the above-described editing mode. Then, if a page image subjected to page editing (hereinafter referred to as a specific page image) is present, the control section 25 causes the background Gb of the specific page image to be represented with a color different from that of the other general area Gb so as to represent the background area Gb in a display form different from that of the other general area Gb and make the specific page image identifiable, as depicted in FIG. 8. FIG. 8 is a diagram showing an example where the left page image 101 on the fifth page is a specific page image.

Note that, even when the image editing screen G2 is being displayed, the control section 25 causes the screen (general area Gb) to be scrolled in response to a scroll operation by the user on the display screen so that arbitrary left page images 101 and arbitrary right page images 201 can be checked.

After the image editing screen G2 is displayed, when a trimming instruction is provided from the user by a touch operation on the trimming button b3 (YES at Step S52), the control section 25 performs trimming processing (Step SB3).

In the trimming processing, when the user specifies an arbitrary page image after the display of the trimming button b3 is switched to inverse display, the control section 25 causes the specified page image to be displayed in an enlarged state, and causes the page image to be trimmed in accordance with a user instruction. Note that, in the trimming processing, by the user giving an instruction for collective processing with a plurality of page images being selected, the same trimming can be collectively performed on the plurality of page images.

When a color correcting instruction is provided from the user by a touch operation on the color correction button b4 (YES at Step SB4), the control section 25 performs color correction processing (Step SB5).

In the color correction processing, when the user specifies an arbitrary page image after the display of the color correction button b4 is switched to inverse display (a state depicted in FIG. 8), the control section 25 causes the specified page image to be displayed in an enlarged state, and performs color correction including the adjustment of brightness and contrast of the page image in accordance with a user instruction. Note that, in the color correction processing as well, by the user giving an instruction for collective processing with a plurality of page images being selected, the same color correction can be collectively performed on the plurality of page images.

Then, the control section 25 returns to the processing at Step SB1, and repeatedly performs the following processing until a storing instruction is provided from the user by a touch operation on the store button b2 (NO at Step SB6).

Then, when a storing instruction is provided from the user (YES at Step SB6), the control section 25 stores the editing result (Step SB7). That is, the control section 25 stores the trimmed or color-corrected page image. As a result, the processing in the image editing mode is ended.

As described above, in the display of a series of page images (left page images and right page images) on the image editing screen G2 in the image editing mode, when there is a specific page image subjected to page editing (replacement or insertion) in the above-described editing mode, this specific page image is made identifiable. That is, a page image which has been acquired by an individual photographing operation and is different from other page images, that is, a page image captured under a different photographing condition is made identifiable.

As a result of this configuration, when performing an image editing operation such as trimming or color correction on a series of page images (left page images and right page images), the user can immediately distinguish between page images where image editing can be collectively performed and page images where image editing is required to be individually performed even without checking individual page images in detail. As a result operability when the series of page images are edited can be improved. In particular, this effect is significant when the number of page images, that is, the number of the pages of a book or the like to be converted into electronic data is large.

In the present embodiment, when the page number editing screen G1 (refer to FIG. 6) is displayed after page editing (such as replacement or insertion) is performed in the page editing mode and when the image editing screen G2 (refer to FIG. 8) is displayed in the image editing mode, the background area Gc of a specific page image subjected to the page editing is represented with a color different from the color of the other general area Gb, or in other words, it is represented in a display form different from that of the other general area Gb, so that the edited page image is made identifiable.

However, any specific method for making a specific page image identifiable can be adopted, and this method can be changed as appropriate. For example, the background area Gc of a specific page image may be hatched. Also, for example, the background area Gc of a specific page image and a rectangular frame surrounding the peripheral edge thereof may be displayed. When the entire background area Gc of a specific page image is displayed in a display form different from that of the other general area Gb as with the present embodiment, high identifiability can be ensured even if the size of the display screen of the display section 23 is small.

Also, in the present embodiment, a page image subjected to page editing is made identifiable by a similar method, irrespective of whether the page image is that after replacement or that after insertion. However, in some cases in the editing mode, page image replacement and insertion are both performed on a series of page images serving as editing targets.

Accordingly, a configuration may be adopted in which, in the page number editing screen G1 displayed after page image replacement and insertion are both performed, the replaced page image and the inserted page image are made identifiable in different display forms. As a result, operability at the time of an editing operation can be further improved. Note that the replaced page image and the inserted page image may be made identifiable also when the image editing screen G2 is displayed in the image editing mode.

Note that, in this configuration where a replaced page image and an inserted page image are made identifiable, information indicating processing details (replacement or insertion) for the replaced page image and the inserted page image is required to be included in editing information regarding a series of page images (management information in the management table 260), in addition to page numbers and the like.

Also, in the present embodiment, the present invention has been applied in the tablet 2. However, the present invention is not limited thereto, and can be applied to another information device such as a general personal computer by supplying a program that can achieve the same processing as that described above. In addition, the supply method therefor can be arbitrarily determined. For example, the program may be supplied from a web page on the Internet to a personal computer or the like.

Moreover, the program may be stored in a server on the Internet, and the processing depicted in FIG. 3 and FIG. 7 may be executed in that server. In this case, the display of the page number editing screen G1 and the image editing screen G2 and a user operation on these screens are performed in a personal computer or the like in cooperation with the server. Here newly-generated document files and the like may be stored in the server or may be stored in the personal computer or the like.

While various embodiments have been described, it is intended that the invention be not limited by any of the details of the description therein but includes all the embodiments which fall within the scope of the appended claims.

What is claimed is:

1. A display control apparatus comprising:
 a processor which causes a plurality of captured images acquired by photographing pages of a book to be arranged and displayed on a display screen with a sequential relation of the pages being maintained,
 wherein the processor, when the plurality of captured images include a plurality of first captured images acquired by performing a first series photographing process in which the pages of the book are respectively photographed in series in conjunction with turning operations of a device for turning the pages of the book, and a second captured image acquired by photographing any page of the pages of the book separately from the first series photographing process, causes the second captured image to be displayed on the display screen such that the second captured image is differentiated from the plurality of first captured images.

2. The display control apparatus according to claim 1, wherein each of the plurality of captured images is a page image acquired by pages of the book being photographed for each page.

3. The display control apparatus according to claim 1, wherein the second captured image is an image with which one of the plurality of first captured images acquired by the first series photographing process has been replaced.

4. The display control apparatus according to claim 1, wherein the second captured image is an image which complements a missing captured image in the plurality of first captured images acquired by the first series photographing process.

5. The display control apparatus according to claim 1, wherein the processor causes the second captured image to be displayed in a manner to be differentiated from the plurality of first captured images, by causing a specific area corresponding to the second captured image on the display screen to be represented in a display form different from a display form of an area other than the specific area.

6. The display control apparatus according to claim 5, wherein the specific area is a background area of the second captured image.

7. The display control apparatus according to claim 5, wherein the processor causes the second captured image to be displayed in a manner to be differentiated from the plurality of first captured images, by causing the specific area to be represented with a color different from a color of the area other than the specific area.

8. A display control method comprising:
 arranging and displaying, on a display screen, a plurality of captured images acquired by photographing pages of a book with a sequential relation of the pages being maintained; and
 displaying, when the plurality of captured images include a plurality of first captured images acquired by performing a first series photographing process in which the pages of the book are respectively photographed in series in conjunction with turning operations of a device for turning the pages of the book, and a second captured image acquired by photographing any page of the pages of the book separately from the first series photographing process, the second captured image on the display screen such that the second captured image is differentiated from the plurality of first captured images.

9. The display control method according to claim 8, wherein the second captured image is an image with which one of the plurality of first captured images acquired by the first series photographing process has been replaced.

10. The display control method according to claim 8, wherein the second captured image is an image which complements a missing captured image in the plurality of first captured images acquired by the first series photographing process.

11. The display control method according to claim 8, wherein the displaying of the second captured image in a differentiated state includes displaying the second captured image in a manner to differentiate the second captured image from the plurality of first captured images, by representing a specific area corresponding to the second captured image on the display screen in a display form different from a display form of an area other than the specific area.

12. The display control method according to claim 11, wherein the specific area is a background area of the second captured image.

13. The display control method according to claim 11, wherein the displaying of the second captured image in a differentiated state includes displaying the second captured image in a manner to differentiate the second captured image from the plurality of first captured images, by representing the specific area with a color different from a color of the area other than the specific area.

14. A non-transitory computer-readable storage medium having stored thereon a program that is executable by a computer to actualize functions comprising:
 arranging and displaying, on a display screen, a plurality of captured images acquired by photographing pages of a book with a sequential relation of the pages being maintained; and
 displaying, when the plurality of captured images include a plurality of first captured images acquired by performing a first series photographing process in which the pages of the book are respectively photographed in series in conjunction with turning operations of a device for turning the pages of the book, and a second captured image acquired by photographing any page of the pages of the book separately from the first series photographing process, the second captured image on the display screen such that the second captured image is differentiated from the plurality of first captured images.

15. The non-transitory computer-readable storage medium according to claim 14, wherein the second captured image is an image with which one of the plurality of captured images acquired by the first series photographing process has been replaced.

16. The non-transitory computer-readable storage medium according to claim 14, wherein the second captured image is an image which complements a missing captured image in the plurality of captured images acquired by the first series photographing process.

17. The non-transitory computer-readable storage medium according to claim 14, wherein the displaying of the second captured image in a differentiated state includes displaying the second captured image in a manner to differentiate the second captured image from the plurality of first captured images, by representing a specific area corresponding to the second captured image on the display screen in a display form different from a display form of an area other than the specific area.

18. The non-transitory computer-readable storage medium according to claim 17, wherein the specific area is a background area of the second captured image.

19. The non-transitory computer-readable storage medium according to claim 18, wherein the displaying of the second captured image in a differentiated state includes displaying the second captured image in a manner to differentiate the second captured image from the plurality of first captured images, by representing the specific area with a color different from a color of the area other than the specific area.

* * * * *